United States Patent Office 3,065,274
Patented Nov. 20, 1962

3,065,274
SEPARATION AND PURIFICATION OF ISOMERIC
DIHYDROXY DIPHENYL SULFONES
Geert C. Vegter and Maria M. De Brabander, Amsterdam, Netherlands, assignors to Shell Oil Company, New York, N.Y., a corporation of Delaware
No Drawing. Filed Oct. 13, 1960, Ser. No. 62,339
Claims priority, application Netherlands Oct. 15, 1959
9 Claims. (Cl. 260—607)

This invention relates to the separation and purification of isomeric dihydroxy diphenyl sulfones, and relates more particularly to an improved process for the separation of 4,4'-dihydroxy diphenyl sulfone in a high state of purity from mixtures comprising 4,4'-dihydroxy diphenyl sulfone in admixture with 2,4'-dihydroxy diphenyl sulfone.

Production of 2,2'-dihydroxy diphenyl sulfone by methods available heretofore generally results in the unavoidable obtaining of reaction mixtures comprising the desired 4,4'-dihydroxy diphenyl sulfone in admixture with substantial amounts of by-product 2,4'-dihydroxy diphenyl sulfone. This is the case, for example, when the desired 4,4'-isomer is produced from starting materials comprising phenol and concentrated sulfuric acid, or phenol and p-phenol sulfonic acid. The separation of the 4,4'-isomer from admixed 2,4'-isomer heretofore has presented considerable difficulties and can generally not be carried out in large scale operations by ordinary practical scale separating means. Consequently, commercially available 4,4'-dihydroxy diphenyl sulfone heretofore generally contained 2,4'-dihydroxy diphenyl sulfone in substantial amounts.

The presence of the by-product 2,4'-isomer, even in relatively small amounts, greatly restricts the field of application of such contaminated 4,4'-dihydroxy diphenyl sulfone. There are numerous fields of application in which the presence of the 2,4'-isomer is a far greater deterrent to the usefulness of the 4,4'-dihydroxy diphenyl sulfone than other by-products normally encountered in the production of this material. This is the case, for example, when the 4,4'-dihydroxy diphenyl sulfone is subjected to a polycondensation with the diglycidyl ether thereof as disclosed and claimed in copending application Serial No. 41,496, filed July 8, 1960. This polycondensation reaction results in the obtaining of valuable thermoplastic products of linear structure which are suitable, among other uses, for the manufacture of threads, fibers and similar articles. The presence of the 2,4'-isomer in the charge to the polycondensation reaction in even relatively small amounts has a highly detrimental effect upon the mechanical properties of the resultant high molecular weight products.

Most of the methods used heretofore to purify crude 4,4'-dihydroxy diphenyl sulfone are suitable only for removing colored contaminants, resins, and the like, without effecting any substantial removal of the contaminating 2,4'-isomer. Such methods include, for example, a water-methanol treatment and recrystallization from water at a temperature above 100° C. in the presence of aromatic solvents. Methods used heretofore directed to a separation of the isomeric sulfones generally comprise methods of a complexity and cost often militating seriously against their practical application. In U.S. Patent 2,392,137 there is disclosed a method for separating a mixture of the 2,4'- and the 4,4'-isomers based upon the formation of the calcium complexes thereof with the aid of such chemical reagents as calcium oxide or calcium hydroxide. According to an article by L. F. Hinkel and G. H. R. Summers in Chem. Soc. Jour. 1949, pp. 2854–2856, separation of the mixed isomers may be brought about by first forming the corresponding benzene adducts by the addition of benzene to a solution of the mixture in acetone.

It has now been found that 4,4'-dihydroxy diphenyl sulfone is separated efficiently and in a state of high purity from mixtures comprising the 4,4'-dihydroxy diphenyl sulfone in admixture with 2,4'-dihydroxy diphenyl sulfone by bringing the mixture into contact with a solvent consisting essentially of sym-tetrachloroethane under conditions of temperature resulting in selective solution of 2,4'-dihydroxy diphenyl sulfone in the solvent and separating the solution comprising dissolved 2,4'-dihydroxy diphenyl sulfone and solvent from the undissolved 4,4'-dihydroxy diphenyl sulfone.

The process of the invention not only enables the efficient, substantially complete removal of the 2,4'-isomer from the 4,4'-dihydroxy diphenyl sulfone with a minimum of operative steps but enables such separation to take place with the use of but a single relatively inexpensive solvent from which the 2,4'-isomer can be readily separated by conventional separating means.

In carrying out the process of the invention the mixed 4,4'- and 2,4'-isomers are brought into contact with the sym-tetrachloroethane solvent under conditions of temperature enabling the selective extraction of the 2,4'-isomer by the solvent from the mixture in suitable conventional equipment enabling the execution of such extraction operation. If desired, the separation by contact with the tetrachloroethane solvent may be effected under conditions providing for the selective crystallization of the separate isomers. Separation of the mixed isomers by operations involving a combination of extraction and crystallization with the aid of the sym-tetrachloroethane solvent is comprised within the scope of the invention.

Separation of the isomeric dihydroxy diphenyl sulfones in accordance with the invention may be carried out at subatmospheric, atmospheric or superatmospheric pressures. In general, the use of atmospheric or slightly higher pressures are found to be satisfactory. After selective solution of the 2,4'-isomer in the sym-tetrachloroethane the 4,4'-dihydroxy diphenyl sulfone may be separated from the resulting solution by suitable conventional means comprising, for example, one or more such steps as filtration, centrifuging, decantation, and the like. 2,4'-dihydroxy diphenyl sulfone may be separated from the resulting extract phase and/or filtrate by conventional means.

Separation of the isomeric sulfones in accordance with the invention by contacting the mixture with sym-tetrachloroethane is carried out at a temperature of from about 80° C. to the boiling temperature of sym-tetrachloroethane solvent at the pressure employed. Although separation of the isomers may be effected to a certain extent at temperatures below about 80°, to as low as about room temperature, it is generally preferred to employ temperatures at which substantially complete separation of the isomers is readily obtained. Thus, it is generally preferred to effect the operation at a temperature of from about 80° C. to about 120° C. In a suitable method of carrying out the invention the sym-tetrachloroethane is combined with the mixed isomers to be separated. The resulting mixture is thereupon brought to the boiling temperature of the sym-tetrachloroethane solvent. It is then cooled to a temperature in the range of about 80° to about 125° C., preferably about 100° C., and filtered (or centrifuged) without lowering to any substantial degree the temperature, thereby obtaining a filter cake consisting essentially of 4,4'-dihydroxy diphenyl sulfone free of any substantial amount of 2,4'-dihydroxy diphenyl sulfone, and a filtrate consisting essentially of sym-tetrachloroethane containing in solution 2,4'-dihydroxy diphenyl sulfone.

The separation process of the invention is applied with particular advantage in combination with the production of the desired 4,4'-dihydroxy diphenyl sulfone. A part or all of the sym-tetrachloroethane solvent to be used in the separation of the 4,4'-isomer from the synthesis reaction products in accordance with the invention may be added directly to the reactants to the synthesis. A further portion, or all, of the tetrachloroethane may be added to the synthesis reaction products before proceeding with the product separation. When operating the synthesis and purification of the 4,4'-isomer in combination, a part or all of the tetrachloroethane solvent may be recycled from the separation step to the synthesis step. A part or all of the impurities in such recycled tetrachloroethane solvent, including 2,4'-dihydroxy diphenyl sulfone, may be separated from the recycled solvent before its introduction into the synthesis zone. Thus, one combination of the separation process of the invention with the synthesis of the dihydroxy diphenyl sulfone is that in which the 4,4'-dihydroxy diphenyl sulfone is formed by reaction of phenol with sulfuric acid or by the reaction of phenol with p-phenol sulfonic acid in the synthesis zone; thereby producing the 4,4'-isomer with simultaneous unavoidable formation of the 2,4'-isomer of the sulfone in substantial amounts. In such a combination operation advantage resides in adding at least a part of the tetrachloroethane solvent to the synthesis step since it can function therein to effect the removal from the reaction zone of the water of reaction in the form of the water-tetrachloroethane azeotrope substantially as rapidly as it is formed. It has been disclosed heretofore to effect the synthesis of the mixed isomers in the presence of an organic solvent capable of entraining water of reaction. It was not known, however, that 2,4'-dihydroxy diphenyl sulfone is appreciably soluble in sym-tetrachloroethane in the presence of the 4,4'-isomer of the sulfone, while the 4,4'-dihydroxy diphenyl sulfone is substantially insoluble in this particular solvent; thereby enabling efficient separation of these isomeric sulfones by selective solution in tetrachloroethane.

When conducting the separating process of the invention in combination with a synthesis of the mixed sulfone isomers in an integrated system it is preferred to effect the synthesis itself of the mixed isomers in two stages. In such synthesis step of the combination process, phenol charge is reacted with concentrated sulfuric acid at a temperature of from about 110° C. to about 135° C., preferably about 125° C., in a first stage. Sym-tetrachloroethane, and optionally an additional amount of phenol, is added to the resulting reaction mixture in a second stage of the synthesis step. In the second stage of the synthesis step the reaction temperature is raised to the boiling temperature. It is noted that tetrachloroethane is preferably not added to the reaction until no substantial amount of unreacted sulfuric acid remains since the acid will attack the solvent, particularly under the temperature conditions employed. Water of reaction is preferably continuously removed by vaporization as the water-tetrachloroethane azeotrope in the second stage of the synthesis process. Vapors comprising the water-tetrachloroethane azeotrope are continuously removed from the second stage of the synthesis step, and condensed. The condensate is separated into an aqueous phase and an organic phase comprising tetrachloroethane by stratification, and at least a part of the organic phase is continuously returned to the synthesis. Sulfuric acid employed as charge to the synthesis generally contains no more than about 10%, and preferably no more than about 2% by weight of water. Sulfuric acid containing $SO_3$ (oleum) may be used in the first stage of the synthesis step. Under these conditions there is formed a reaction mixture comprising 4,4'-dihydroxy diphenyl sulfone, 2,4'-dihydroxy diphenyl sulfone and sym-tetrachloroethane in the second stage of the synthesis step. The desired 4,4'-isomer is separated from the resulting reaction mixture formed in the second stage of the synthesis step by filtration (or centrifuging) at a temperature in the range of from about 50 to about 140° C. In a preferred embodiment, the reaction mixture from the second stage of the synthesis step is cooled from its boiling temperature to the suitable separation temperature in the range of from about 50° to about 140° C. and filtered at this temperature; thereby obtaining a filter cake consisting essentially of 4,4'-dihydroxy diphenyl sulfone free of any substantial amount of the 2,4'-isomer and a filtrate consisting essentially of tetrachloroethane containing by-products of the synthesis reaction including 2,4'-dihydroxy diphenyl sulfone. At least a part of the filtrate thus obtained is recycled to the reaction zone. The impurities comprising 2,4'-isomer may be retained in the filtrate to suppress their further formation in the synthesis step and/or to effect the isomerization of recycled impurities to the desired 4,4'-isomer. The high purity of the 4,4'-dihydroxy diphenyl sulfone isomer thus obtained, it has been found, renders it particularly suitable for use as charge to the polycondensation of this material with its diglycidyl ether.

*Example*

A mixture of 100 g. of sulphuric acid (98%) and 96.1 g. of phenol was rapidly heated up to 125° C. and kept at this temperature for 30 minutes. Another portion of 92.1 g. of phenol and 120 ml. of s-tetrachloroethane was then added and the mixture further heated up to the boiling point (about 140° C.), the mixture being continually, thoroughly stirred. The vapors were condensed, two phases being formed. The top phase was water and the bottom phase tetrachloroethane. The water phase was subsequently separated and the bottom phase returned to the reaction mixture. During this azeotropic removal of the reaction water the temperature of the boiling reaction mixture rose to 160° C. After 36.6 ml. of water had been separated (after 13½ hours) the reaction mixture was cooled to 100° C., filtered and the filter cake washed with hot tetrachloroethane. After drying in vacuo at 100° C. 193 g. of 4,4'-dihydroxy diphenyl sulfone, substantially free of 2,4'-dihydroxy diphenyl sulfone, were obtained having a melting point of 227°–229° C. This was dissolved in 250 ml. of hot methanol and treated with 5 grams of decolorizing carbon. After filtering off the carbon 1800 ml. of water were added and the solution heated to 93° C., a clear, light pink solution being formed. On cooling the solution 181 g. of 4,4'-dihydroxy diphenyl sulfone were separated therefrom and had, after drying, a melting point of 243–245° C.

We claim as our invention:

1. The process for the separation of 4,4'-dihydroxy diphenyl sulfone from a mixture comprising said 4,4'-dihydroxy diphenyl sulfone in admixture with 2,4'-dihydroxy diphenyl sulfone which comprises, contacting said mixture with a solvent consisting essentially of sym-tetrachloroethane, thereby selectively dissolving said 4,4'-dihydroxy diphenyl sulfone in said solvent, and separating the resulting solution comprising said solvent and said 2,4'-dihydroxy diphenyl sulfone from said 4,4'-dihydroxy diphenyl sulfone.

2. The process in accordance with claim 1 wherein said mixture is contacted with said solvent at a temperature in the range of 80° C. to the boiling temperature of said solvent.

3. The process for the separation of 4,4'-dihydroxy diphenyl sulfone from a mixture comprising said 4,4'-dihydroxy diphenyl sulfone in admixture with 2,4'-dihydroxy diphenyl sulfone, which comprises contacting said mixture with a solvent consisting essentially of sym-tetrachloroethane at a temperature of from about 80° C. to about the boiling temperature of said solvent, thereby selectively dissolving 2,4'-dihydroxy diphenyl sulfone in said solvent, and separating the resulting solution comprising sym-tetrachloroethane and 2,4'-dihydroxy diphenyl sulfone from said 4,4'-dihydroxy diphenyl sulfone.

4. The process for the separation of 4,4'-dihydroxy diphenyl sulfone in a high state of purity from a mixture comprising said 4,4'-dihydroxy diphenyl sulfone in admixture with 2,4'-dihydroxy diphenyl sulfone which comprises, contacting said mixture with a solvent consisting essentially of sym-tetrachloroethane at a temperature of from about 80° to about the boiling temperature of said solvent thereby selectively dissolving 2,4'-dihydroxy diphenyl sulfone in said solvent, and subjecting the resulting mixture to filtration at a temperature of from about 80° to about 120° C., thereby forming a filter cake consisting essentially of 4,4'-dihydroxy diphenyl sulfone containing no substantial amount of 2,4'-dihydroxy diphenyl sulfone and a filtrate comprising said solvent and said 2,4'-dihydroxy diphenyl sulfone.

5. The process for separating 4,4'-dihydroxy diphenyl sulfone in a high state of purity from a mixture comprising said 4,4'-dihydroxy diphenyl sulfone in admixture with 2,4'-dihydroxy diphenyl sulfone which comprises, contacting said mixture with a solvent consisting essentially of sym-tetrachloroethane at a temperature of from about 80° to about 120° C. thereby selectively dissolving said 2,4'-dihydroxy diphenyl sulfone in said solvent with the formation of a solid phase consisting essentially of 4,4'-dihydroxy diphenyl sulfone and a liquid phase consisting essentially of a solution of said 2,4'-dihydroxy diphenyl sulfone in said solvent, and filtering said liquid phase from said solid phase at a temperature of from about 80° to about 120° C.

6. The process for separating 4,4'-dihydroxy diphenyl sulfone from a mixture containing said 4,4'-dihydroxy diphenyl sulfone in admixture with 2,4'-dihydroxy diphenyl sulfone which comprises, adding a solvent consisting esesntially of sym-tetrachloroethane to said mixture, heating the resulting solvent-containing mixture to about the boiling temperature of said solvent, thereafter cooling said solvent containing mixture to a temperature of from about 80° to about 120° C., and filtering said cooled solvent-containing mixture at a temperature of from about 80° to about 120° C., thereby separating a solid phase consisting essentially of 4,4'-dihydroxy diphenyl sulfone free of any substantial amount of 2,4'-diphenyl dihydroxy sulfone from a liquid phase consisting essentially of said solvent and said 2,4'-dihydroxy diphenyl sulfone.

7. The process for the production of high purity 4,4'-dihydroxy diphenyl sulfone containing no substantial amount of 2,4'-dihydroxy diphenyl sulfone which comprises reacting phenol with sulfuric acid at a temperature of from about 110° to about 135° C. in a first reaction stage, adding a solvent consisting essentially of sym-tetrachloroethane and additional phenol to the resulting reaction mixture, heating the resulting solvent-containing reaction mixture to about the boiling temperature of said solvent in a second reaction stage, continuously withdrawing vapors comprising water and sym-tetrachloroethane from said second reaction stage, cooling said withdrawn vapors thereby forming a condensate comprising an aqueous phase and a sym-tetrachloroethane phase, continously returning said condensed sym-tetrachloroethane phase to said second reaction stage thereby forming a reaction mixture comprising 4,4'-dihydroxy diphenyl sulfone, 2,4'-dihydroxy diphenyl sulfone and tetrachloroethane while selectively dissolving 2,4'-dihydroxy diphenyl sulfone in said solvent in said second reaction stage, cooling said reaction mixture formed in said second reaction stage to a temperature in the range of from about 50° to about 140° C., and filtering said cooled reaction mixture at a temperature in the range of from about 50° to about 140° C., thereby separating a solid phase consisting essentially of 4,4'-dihydroxy diphenyl sulfone containing no substantial amount of 2,4'-dihydroxy diphenyl sulfone and a liquid filtrate consisting essentially of a solution of 2,4'-dihydroxy diphenyl sulfone in sym-tetrachloroethane from said cooled reaction mixture and recycling at least a part of said filtrate to said reaction.

8. The process in accordance with claim 7 wherein said phenol is reacted with said sulfuric acid at a temperature of about 125° C. in said first reaction stage.

9. The process in accordance with claim 7 wherein the said solvent-containing reaction mixture formed in said second reaction stage is cooled to a temperature in the range of from about 80° to about 125° C. and thereafter filtered at a temperature of from about 80° to about 125° C.

References Cited in the file of this patent

UNITED STATES PATENTS

| | | |
|---|---|---|
| 2,392,137 | Foster | Jan. 1, 1936 |
| 2,833,828 | Sauls | May 6, 1958 |

FOREIGN PATENTS

| | | |
|---|---|---|
| 1,012,070 | Germany | July 11, 1957 |